(12) United States Patent
Smith

(10) Patent No.: US 9,554,962 B1
(45) Date of Patent: Jan. 31, 2017

(54) WALKER STRUCTURE

(71) Applicant: Shirley Beemer, Greenville, SC (US)

(72) Inventor: Donald L Smith, Greenville, SC (US)

(73) Assignee: Shirley Beemer, Greenville, SC (US)

( * ) Notice: Subject to any disclaimer, the term of this patent is extended or adjusted under 35 U.S.C. 154(b) by 0 days.

(21) Appl. No.: 14/838,107

(22) Filed: Aug. 27, 2015

(51) Int. Cl.
*A61H 3/04* (2006.01)

(52) U.S. Cl.
CPC ..................... *A61H 3/04* (2013.01)

(58) Field of Classification Search
CPC ............ A61H 3/00; A61H 3/04; A61H 3/008; A61H 2201/1633
USPC .................. 135/67; 297/5; 482/66
See application file for complete search history.

(56) References Cited

U.S. PATENT DOCUMENTS

| | | | | |
|---|---|---|---|---|
| 612,278 | A * | 10/1898 | Schlunz | A47D 13/046 108/50.16 |
| 2,316,100 | A * | 4/1943 | Nelson | A47D 13/043 280/87.05 |
| 4,342,465 | A * | 8/1982 | Stillings | A61H 3/04 135/67 |
| 4,953,851 | A * | 9/1990 | Sherlock | A61H 3/04 237/6 |
| 5,040,556 | A * | 8/1991 | Raines | A61H 3/00 135/67 |
| 5,476,432 | A * | 12/1995 | Dickens | A61H 3/04 135/67 |
| 6,056,673 | A * | 5/2000 | Arrecis | A61H 3/00 135/67 |
| 6,527,285 | B1 * | 3/2003 | Calandro, II | A61H 3/04 280/650 |
| 6,595,530 | B2 * | 7/2003 | Wood | A61H 3/04 280/42 |
| 6,742,523 | B2 * | 6/2004 | Dubats | A61H 3/008 128/875 |
| 7,735,499 | B1 * | 6/2010 | Pennise | A61H 3/04 135/67 |
| 8,104,780 | B1 * | 1/2012 | McConnell-Copploe | A47D 13/043 280/47.371 |
| 8,720,914 | B1 * | 5/2014 | Heath | A61H 3/04 135/67 |
| 2005/0183759 | A1 * | 8/2005 | Wolfe | A61H 3/04 135/67 |
| 2015/0224014 | A1 * | 8/2015 | Cook | A61H 3/04 280/657 |
| 2015/0238381 | A1 * | 8/2015 | Swiniarski | A61H 3/00 297/5 |

\* cited by examiner

*Primary Examiner* — Noah Chandler Hawk
(74) *Attorney, Agent, or Firm* — Amy Allen Hinson; Nexsen Pruet, LLC

(57) ABSTRACT

A walker having a frame with a plurality of legs with each leg having a wheel or roller located at a respective free end for providing rolling movement of the walker. The frame is dimensioned to surround the person utilizing the walker. The user's weight can be supported by a seat member, which is releasably attached to the frame. The frame of the walker can be pivotally opened and closed to permit the entry and exit of the user with relation to interior of the walker. Depending on the height and comfort of the user, the support frame is also vertically adjustable.

18 Claims, 6 Drawing Sheets

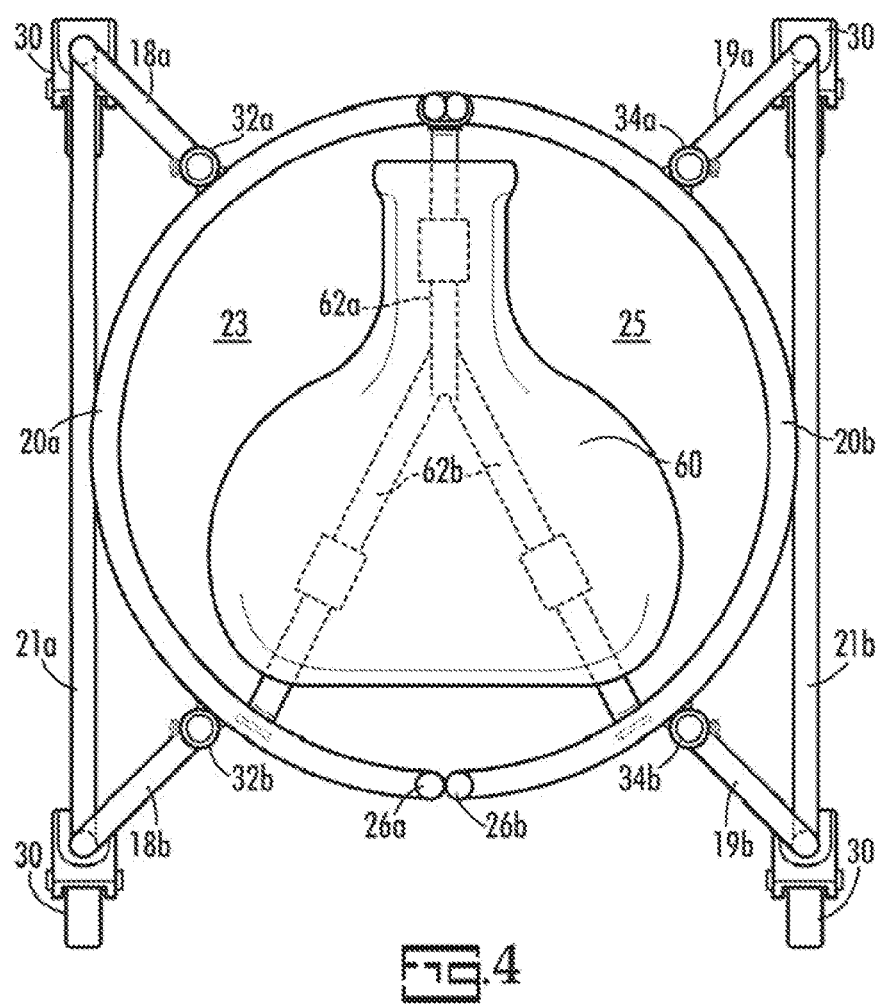

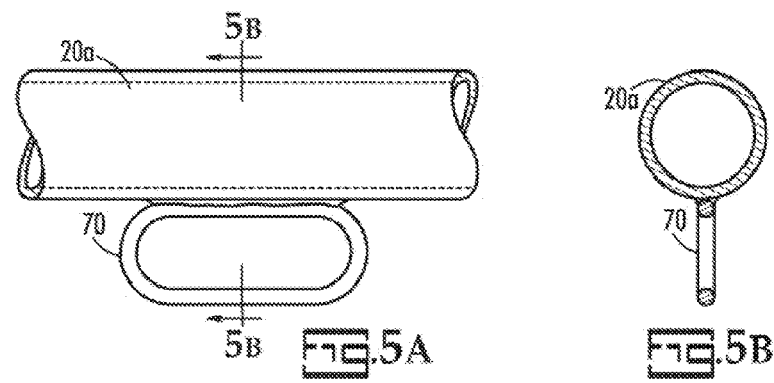
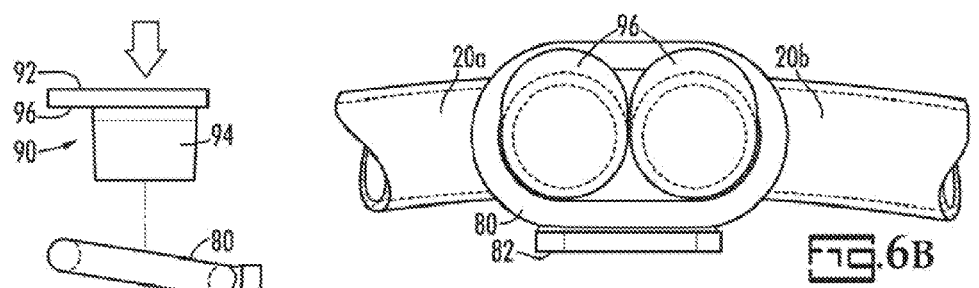
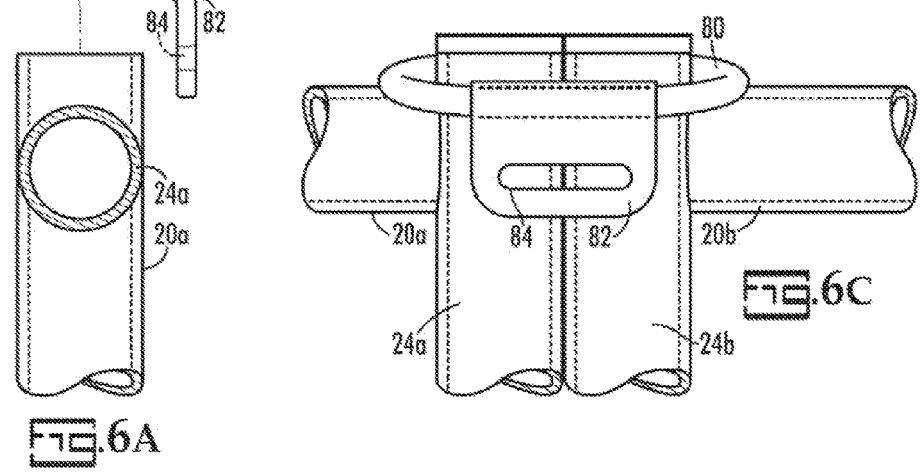

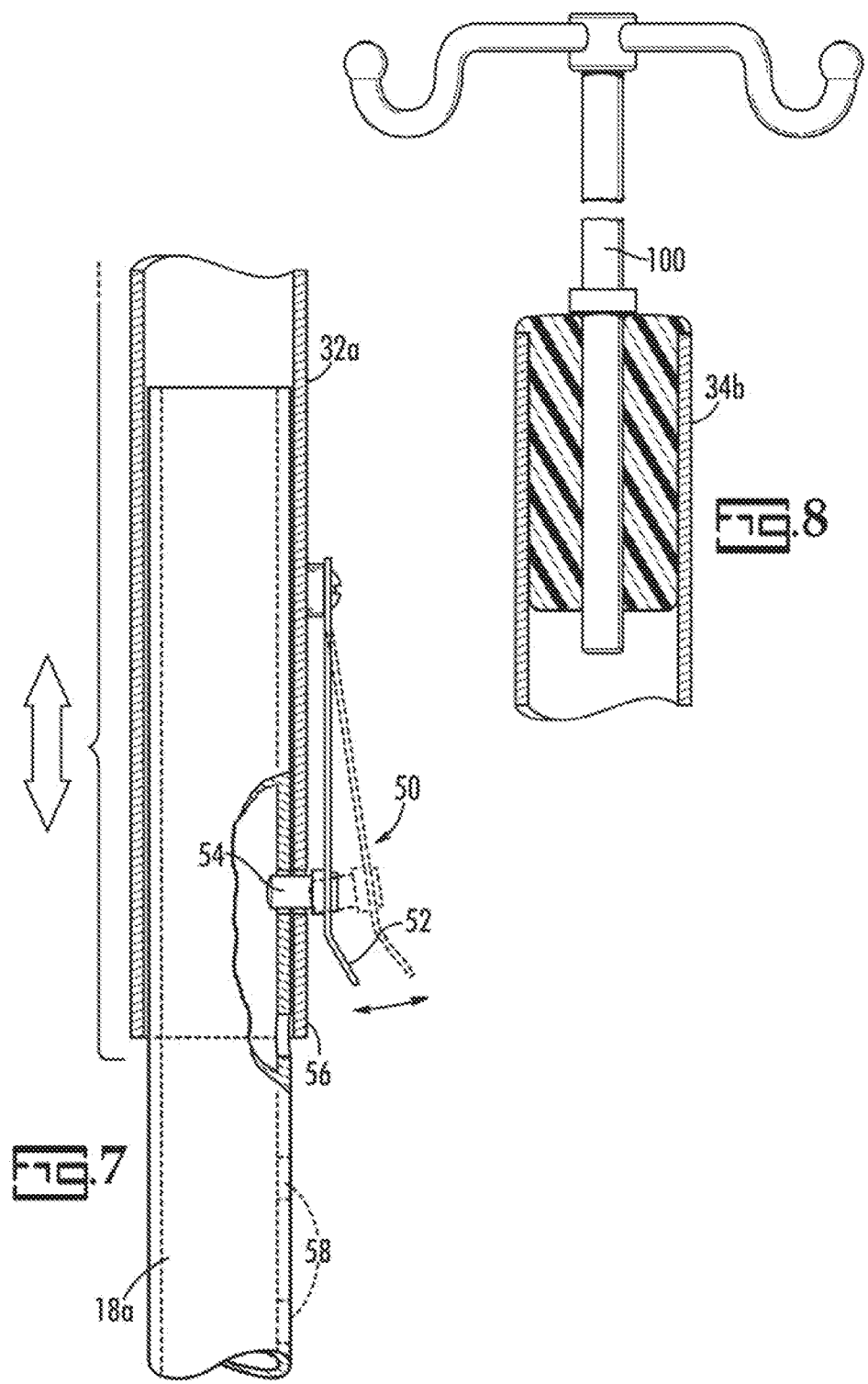

WALKER STRUCTURE

BACKGROUND OF THE INVENTION

The present application relates to an apparatus for assisting persons having difficulty walking.

Walkers or strollers, as well as other walking aides are utilized when a person requires additional support in walking effectively and/or with less pain or discomfort. Such walking devices have both advantages and disadvantages. For example, while a single-legged crutch may be one of the lightest and least cumbersome aides, such a device is insufficient for a weaker or more disabled person. A two-legged push walker is more cumbersome, and still may not provide sufficient support or relief to one struggling to walk effectively. Four-legged walkers are better for particularly weak or disabled persons. However, these devices ray not include sufficient safety measures, such s a secured harness, to prevent potential accidents. Furthermore, the structures of these devices are so cumbersome that other important devices, such as IV devices in the case of a hospitalized person, may be difficult to be connected to or used by the person operating the walking device.

Thus, there exists a need for a walking device that can effectively support a person requiring assistance in walking and that is also convenient to operate.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

The present invention includes a walker. In one embodiment, the walker comprises a frame including an upper frame, wherein the upper frame includes a first pair of upper support rails that are horizontally spaced apart by and connected to a first pair of front vertical braces and a second pair of back vertical braces. Also included in the walker is a seat member connected to the upper frame, wherein the seat member has a frontward strap that is removeably connected to the first pair of front vertical braces. A plurality of legs are connected to the upper frame, wherein the plurality of legs provide vertical spacing of the upper frame above a supporting surface, and wherein the vertical spacing is adjustable.

Additionally, the present invention includes a method for using the walker by a person. In one embodiment, the method comprises the steps of: providing a walker apparatus, comprising: 1) a frame having an upper frame, wherein the upper frame includes a first pair of upper support rails that are horizontally spaced apart by and connected to a first pair of front vertical braces and a second pair of back vertical braces; a seat member connected to the upper frame, the seat member having a frontward strap that is re moveably connected to the first pair of front vertical braces; and a plurality of legs connected to the upper frame, wherein the plurality of legs provide vertical spacing of the upper frame above a supporting surface, and wherein the vertical spacing is adjustable; 2) forming an ingress to the walker apparatus by forcing apart the first pair of front vertical braces; 3) entering by a user through the ingress into the interior of the frame of the walker apparatus; 4) closing the walker apparatus by forcing together the first pair of front vertical brace 5) placing the seat member between the legs of the user; 6) connecting the frontward strap to the first pair of front vertical braces; and 7) sitting by the user on the seat member.

Other features and their advantages will be readily apparent to those skilled in decorative arts, techniques and equipment from a careful reading of the Detailed Description of Preferred Embodiments, accompanied by the following drawings.

BRIEF DESCRIPTION OF THE DRAWINGS

In the figures,

FIG. 4 is a perspective top view of a walker device according to an embodiment of the present invention;

FIG. 5A is a detail side view of an attachment member on a frame of a walker according to an embodiment of the present invention;

FIG. 5B is a cross sectional view taken from Line 5B of an attachment member on a frame of a walker according to an embodiment of the present invention;

FIG. 6A is an exploded detail view of an attachment member on a frame of a walker according to an embodiment of the present invention;

FIG. 6B is a top detail view of an attachment member on a frame of a walker according to an embodiment of the present invention;

FIG. 6C is a back detail view of an attachment member on a frame of a walker according to an embodiment of the present invention;

FIG. 7 is a detail cutaway view of a frame for a walker according to an embodiment of the present invention; and FIG. 8 is a detail cutaway view of an attachment member on a frame of a walker according to an embodiment of the present invention.

DETAILED DESCRIPTION OF A PREFERRED EMBODIMENT

The present invention includes a method and device for assisting disabled or weak persons in walking. The walker device includes a frame with a plurality of legs with each leg having a wheel or roller located at a respective free end for providing rolling movement of the walker. Preferably, the frame is dimensioned to surround the person utilizing the walker. Furthermore, the user's weight is supported by a seat member, which can be releasably attached to the frame. The frame of the walker can be pivotally opened and closed to permit the entry and exit of the user with relation to interior of the walker. Depending on the height and comfort of the user, the support frame is also vertically adjustable. Alternatively, the frame of the walker can include openings or attachment means to connect other devices, such as IV supports, being used by the person in the walker.

The present invention further includes a method for using a walker including the steps of providing a walker as previously described, pivotally opening the walker frame; stepping into the interior of the walker frame; placing the seat member between the legs of the user; pivotally closing the walker frame around the user; and attaching the seat ember to the closed walker frame.

Figure 1:
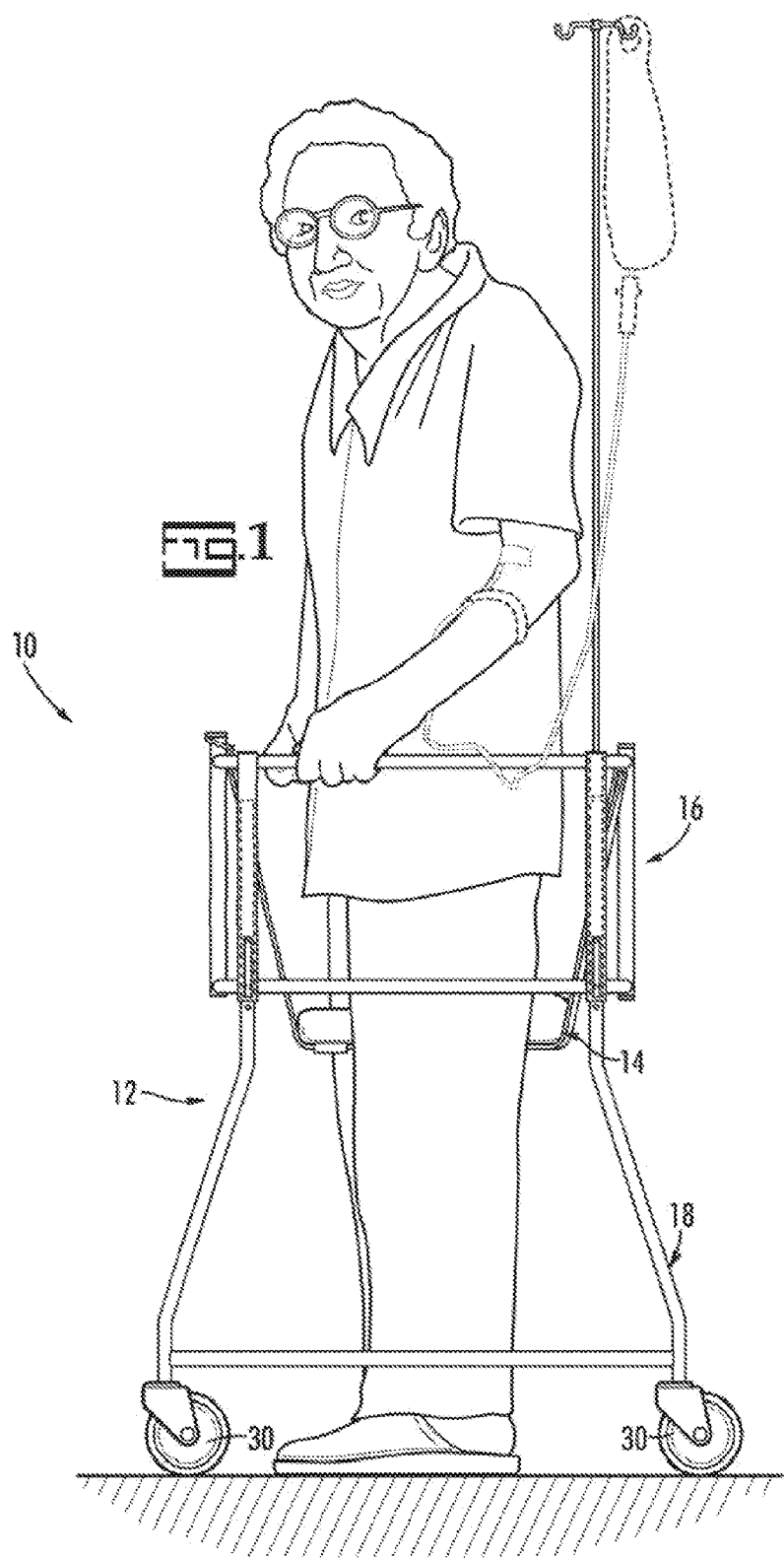
FIG. 1 is a perspective view of a walker device according to an embodiment of the present invention.
Figure 2:
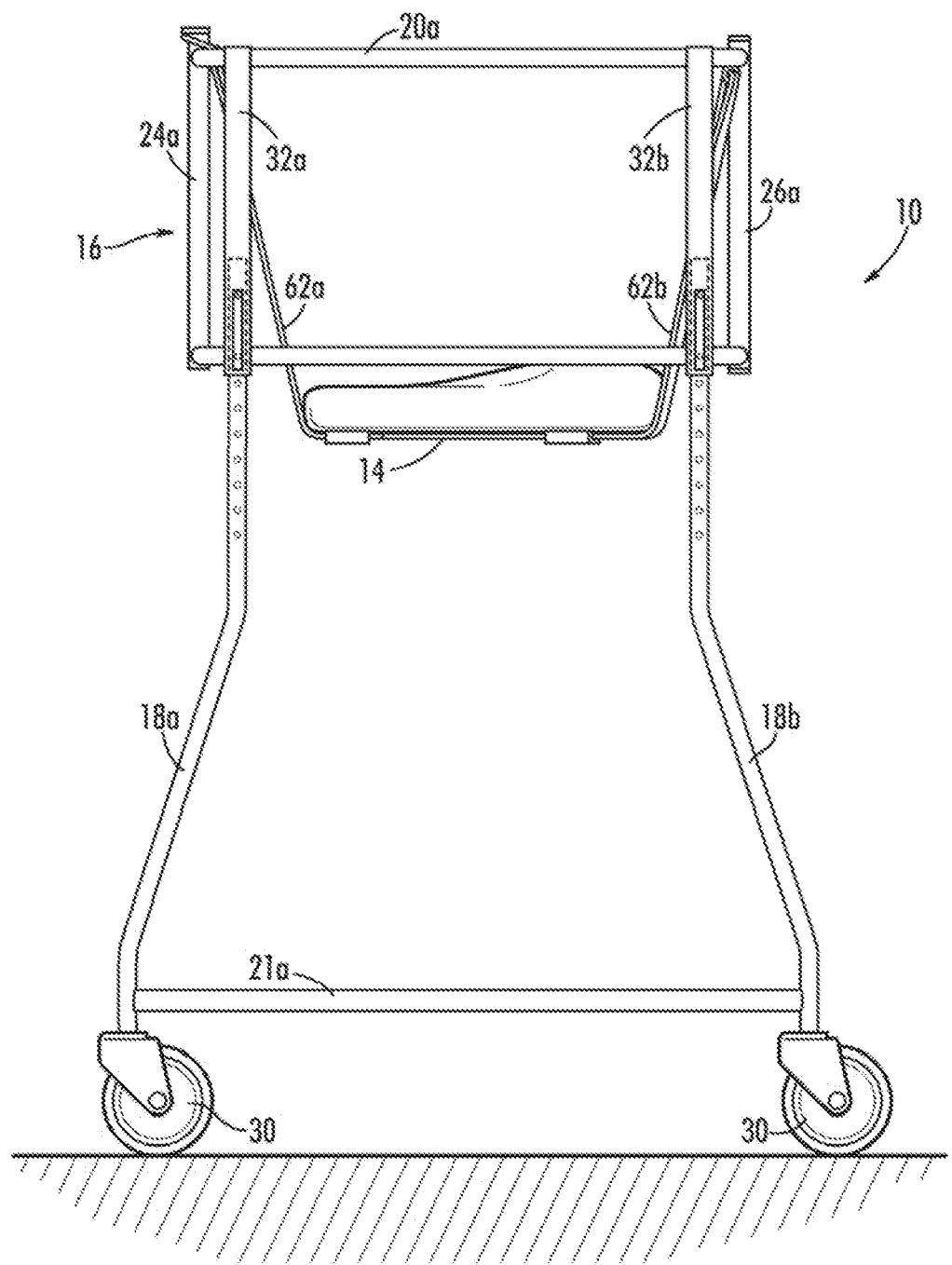
FIG. 2 is a perspective side view of a walker device according to an embodiment of the present invention.
Figure 3:
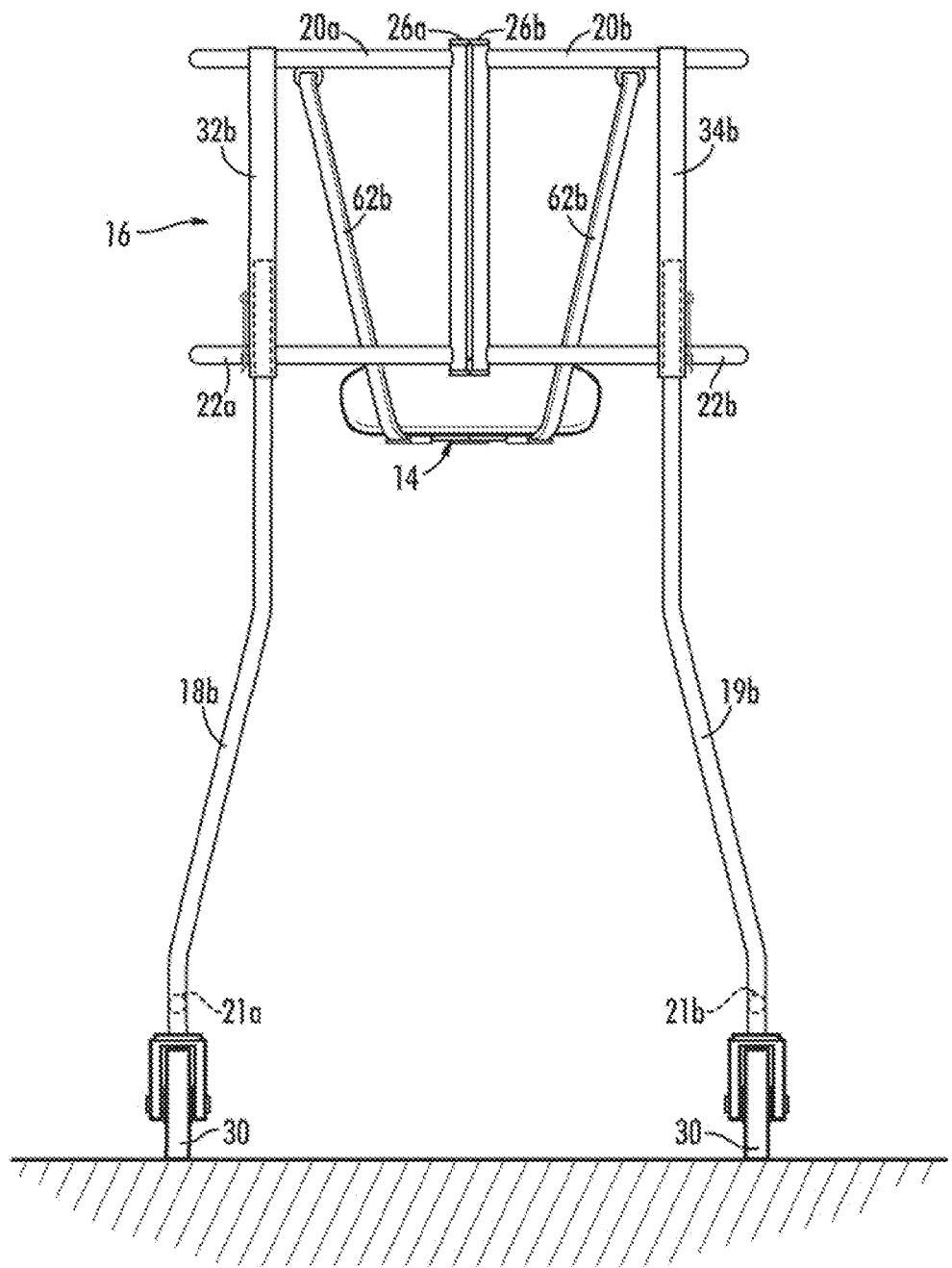
FIG. 3 is a perspective back view of a walker device according to an embodiment of the present invention.

Referring now to the figures, according to one embodiment of the present invention, and as shown in FIGS. 1-4, a walker device 10 includes a frame member 12 operatively connected to a seat member 14 for use by a person.

As illustrated, the frame member includes an upper frame 16 supported by a plurality of legs 18 that provide vertical spacing of the upper frame 16 above the ground or a supporting surface. Each leg of the plurality of legs 18 includes a means for rolling, such as a wheel 30, at a respective free end opposite from the end connected to the upper frame 16, for providing rolling movement of the walker 10 along the ground or supporting surface.

The upper frame 16 includes two pairs of support rails, including a first pair of upper support rails 20a,b and a second pair of lower support rails 22a,b. Preferably, the seat member 14 is operatively connected to the pair of upper support rails 20a,b.

The pair of upper support rails 20a,b are vertically spaced apart from the pair of lower support rails 22a,b by a front and back vertical braces 24, 26. In particular, the frame include a first pair of front vertical braces 24a,b and a second pair of back vertical braces 26a,b. Additionally, the front and back vertical braces 24a,b and 26a,b provide horizontal spacing between the upper support rails 20a,b and the lower support rails 22a,b, respectively, and generally delineate a central line between a first left half 23 and a second right half 25 of the upper frame 16, seen best in FIG. 4, when the frame is in a closed, patient encircling position.

The back pair of vertical braces 26a,b are hingedly or pivotally connected so as to permit pivoting movement of the upper and lower support rails 20a,b and 22a,b about a hinge or a pivot. The front pair of vertical braces 24a,b are not otherwise connected unless by the seat member 14, as discussed further below when the walker is in use. Thus, the upper frame 16 is rotatably moveable from a closed, user encircling position to an open, user ingress/egress position.

The upper and lower support rails 20a,b and 22a,b are preferably curved or circular and about parallel from each other, respectively, so that from a top view perspective, shown in FIG. 4, the upper frame 16 appears to form a circle around the user when in a closed position. Other dimensions and shapes are contemplated by the present invention provided that the upper frame 16 surrounds the user in a compact and efficient manner.

The upper frame further includes a plurality of vertical coupling members that connect the plurality of legs 18 to the upper frame. As shown, a first pair of vertical coupling members 32a,b and a second pair of vertical coupling members 34a,b are spaced apart and disposed along the first left half 23 and the second right half 25, respectively, of the upper frame 16. Each vertical coupling member is generally cylindrical or hollow and includes an interior space that is dimensioned to receive by telescoping engagement an end of each leg of the plurality of legs 18 that is opposing the leg end including a wheel 30.

In particular, the plurality of legs includes a first pair of legs 18 a,b connected to the first pair of vertical coupling members 32a,b and a second pair of legs 19a,b connected to the second pair of vertical coupling members 34a,b. As further shown, the legs are preferably diverging with respect to the center of the upper frame 16. At the coupling end of each leg, the leg member is generally straight, and between the coupling end and wheel end of the let, the leg diverges or is angled outward and extends beyond the outer edges of the upper frame 16.

Each pair of legs 18a,b and 19a,b can include cross bars, and, specifically, a first horizontal brace 21a and a second horizontal brace 21b that connect and provide horizontal spacing between the first pair of legs 18a,b and the second pair of legs 19a,b, respectively. A user of the walker device will stand between the first and second horizontal brace 21a,b when encircled by the walker.

The overall height of the walker device 10 is adjustable to accommodate the user and his or her dimensions and comfort level. As shown in the figures, and especially in FIG. 7, the vertical spacing provided by each leg of the plurality of legs 18 is adjustable by a moveable locking member 50 that connects the legs 18a,b and 19a,b to the vertical coupling members 32a,b and 34a,b, respectively. Although alternative locking members can be employed, one embodiment includes a leaf spring member 52 on or attached to each vertical coupling member, such as by a mechanical attaching means or formed integrally therewith. A locking pin 54 is disposed on or along the leaf spring member 52, which maintains the vertical coupling member and the respective leg aligned and in a locked position, such as by force fit into to the eclipsed voids.

In particular, the locking pin 54 is dimensioned to be received by both an alignment void 56 along each of the vertical coupling members and one of a plurality of vertically spaced adjustment voids 58 along each of the plurality of legs. To lock the legs in place, the leaf spring member 52 preferably persuades the locking pin 54 into engagement so that the pin 54 mates with an alignment void 56 when it eclipses one of the plurality of adjustment voids 58. Alternatively, the locking member 50 could also include a coiled spring, or simply a thumb screw that is placed into the alignment and adjustment voids, which in side-by-side or eclipsed relation.

The seat member 14 of one embodiment of the present invention is shown in more detail in FIGS. 4-6C. As illustrated, the seat member 14 includes a seat 60 that is suspended within the interior space of the frame member 12 and connected to the upper frame 16 by means for attachment. Although alternative attachment means are suitable for use in the present invention, one embodiment of the invention preferably includes attachment straps that are of a unitary construction, such as a Y-strap, including a forward strap 62a connected to two diverging rearward straps 62b. The seat 60 is preferably disposed on and secured to the top of the Y-strap attachment means. Alternatively, separate straps, including a forward strap and two rearward straps could be secured to the outer edges of the seat 60 without the need for a unitary construction.

Each of the rearward straps 62b are connected to the upper support rails 20a,b towards the back side of the walker 10. As further shown in FIGS. 5A-5B, the rearward straps 62b can connect to a rearward strap attachment or connector member, such as a ring 70, that is connected to the support rails 20a,b. The ring 70 can be monolithic with the rails 20a,b or can be a separate member that is affixed to the rail. Optionally, the rearward straps 62b can be directly affixed to the surface of the support rails 20a,b.

While the rearward straps 62b can remain connected to the upper frame 16, the frontward strap 62a is preferably releasably connected to the upper frame 16 and maintains the walker 10 in a closed position when the seat member 14 is assembled and a user mounts the seat. In particular, the frontward strap 62a is connected to ring or loop member 80 that is dimensioned to receive both front vertical brace members 24a,b in adjacent relation. When the ring member 80 is engaged with and surrounds the vertical brace members 24a,b, the upper frame 16 remains in a locked position.

Alternatively, at the top end of each vertical brace member 24*a,b*, can be included a capped top member 90 including a cap 92 over a barrel 94 that is dimensioned to fit, preferably snugly, within an interior space or recess at the top of the vertical brace member, such as by female-male mating relation. Furthermore the cap 92 includes an overlapping flange 96 that is about perpendicular to the from the front vertical brace member, and that extends out beyond the outer edges of the barrel 94, as well as the edges of the vertical brace members 24*a,b*, by a length sufficient to prevent the dislodgement or movement of the ring member 80 when the seat member 14 is in place and being used. The flange 96 serves as a stop for the ring member 80 and/or frontward strap 62*a* so that the frontward strap 62*a* and ring member 80 are unable to move over the top of the vertical brace members 24*a,b*. Alternatively, the vertical brace members 24*a,b* can each include a closed top and overlapping flange that are monolithic.

In another alternative embodiment, the ring member 80 can include an attachment or connector member 82 that has an opening 84 through which the forward seat strap 62 can be threaded and secured.

In yet another embodiment, the free end of one of the vertical coupling members 32*a,b* and 34*a,b* can optionally include an apparatus pole 100 that is fitted with or coupled to the vertical coupling member, such as vertical coupling member 34*b*. This pole can be used as an IV pole or other type of support for medical equipment that may need to be employed by the user.

A method for use of the present walker 10 includes providing a walker 10 as shown in FIGS. 1-4. The walker is opened, if found in a closed position, by spreading apart with manual force the front vertical brace members 24*a,b* to allow the stepping into by a user the interior of the frame member 12. With the back vertical brace members 26*a,b* at the user's back side and the front vertical brace members 24*a,b* at the user's front side, the front vertical brace members 24*a,b* are pushed towards each other until the members 24*a,b*, are side by side and adjacent. The seat member 14 is then placed between the legs of the user, and the frontward strap 62*a* is connected to the vertical brace members 24*a,b*. If a ring member 80 is included, the ring member 80 is threaded over the top of both vertical brace members 24*a,b* and rests on the surface of the upper support rails 20*a,b*. The user is then free to sit down onto the seat 60 and begin walking with the assistance of the walker device 10.

To exit the walker 10, the user will stand and the frontward strap 62*a* and/or ring member 80 to which the strap is secured is dislodged from the upper frame 16. The vertical brace members 24*a,b* can then be pivotally opened by manual force to provide a sufficient egress to the user.

Those skilled in the art of walker devices and methods will appreciate from the foregoing description of preferred embodiments that substitutions and modification can be made without departing from the spirit and scope of the invention which is defined by the appended claims.

What is claimed is:

1. A walker apparatus, comprising:
   a frame having an upper frame, wherein said upper frame includes a first pair of upper support rails that are horizontally spaced apart by and connected to a first pair of front vertical braces and a second pair of back vertical braces;
   a seat member connected to said upper frame, said seat member having a frontward strap that is removeably connected to said first pair of front vertical braces; and
   a plurality of legs connected to said upper frame, wherein said plurality of legs provide vertical spacing of said upper frame above a supporting surface, and wherein said vertical spacing is adjustable;
   wherein each front vertical brace of said first pair of front vertical braces includes a flange that extends out beyond the outer edge of said front vertical brace, wherein each front vertical brace of said first pair of front vertical braces includes a top recess, and wherein said flange is connected to a barrel that is dimensioned to be received by said top recess.

2. The apparatus as recited in claim 1, further comprising a second pair of lower support rails vertically spaced apart from said first pair of upper support rails, wherein said second pair of lower support rails are horizontally spaced apart by and connected to said first pair of front vertical braces and said second pair of back vertical braces.

3. The apparatus as recited in claim 2, wherein said first pair of upper support rails and said second pair of lower support rails are about parallel from each other and are each curved.

4. The apparatus as recited in claim 1, wherein said second pair of back vertical braces are pivotally connected.

5. The apparatus as recited in claim 1, further comprising a plurality of vertical coupling members on said upper frame, wherein each of said plurality of vertical coupling members connects each of said plurality of legs to said upper frame, respectively.

6. The apparatus as recited in claim 5, wherein said upper frame has a first right half and a second left half, wherein said plurality of vertical coupling members includes a first pair of vertical coupling members spaced apart along said first left half and a second pair of vertical coupling members spaced apart along said second right half, and wherein said plurality of legs includes a first pair of legs connected to said first pair of vertical coupling members and a second pair of legs connected to said second pair of vertical coupling members.

7. The apparatus as recited in claim 6, wherein each coupling member of said plurality of coupling members is dimensioned to receive each leg of said plurality of legs includes by telescoping engagement.

8. The apparatus as recited in claim 7, wherein each coupling member of said plurality of coupling members includes an alignment void, wherein each leg of said plurality of legs includes plural, vertically spaced adjustment voids, and wherein said plurality of coupling members are connected to said plurality of legs by a moveable locking member.

9. The apparatus as recited in claim 8, wherein said moveable locking member includes a leaf spring having a locking pin, wherein said locking pin is dimensioned to be received by force fit said alignment void and one of said plural adjustment voids when said voids are eclipsed.

10. The apparatus as recited in claim 9, wherein said vertical spacing between said upper frame and a supporting surface is adjustable by the locking of different ones of said plural adjustment voids by said moveable locking member.

11. The apparatus as recited in claim 6, wherein said first pair of legs includes a first horizontal brace connecting said first pair of legs, and wherein said second pair of legs includes a second horizontal brace connecting said second pair of legs.

12. The apparatus as recited in claim 1, wherein said upper frame includes a second pair of lower support rails that are vertically spaced apart and about parallel to said first pair of upper support rails, said second pair of lower support rails being horizontally spaced apart by and connected to said first pair of front vertical braces and said second pair of back vertical braces.

13. A walker apparatus, comprising:
a frame having an upper frame, wherein said upper frame includes a first pair of upper support rails that are horizontally spaced apart by and connected to a first pair of front vertical braces and a second pair of back vertical braces;
a seat member connected to said upper frame, said seat member having a frontward strap that is removeably connected to said first pair of front vertical braces; and
a plurality of legs connected to said upper frame, wherein said plurality of legs provide vertical spacing of said upper frame above a supporting surface, and wherein said vertical spacing is adjustable;
wherein each front vertical brace of said first pair of front vertical braces includes a flange that extends out beyond the outer edge of said front vertical brace, wherein said frontward strap of said seat member includes a ring member that is dimensioned to surround said first pair of front vertical braces, and wherein said flange prevents dislodging of said ring member when said ring member surrounds said front vertical braces.

14. The apparatus as recited in claim 13, wherein said seat member includes two rearward straps that are connected to said first pair of upper support rails.

15. The apparatus as recited in claim 14, wherein each upper support rail of said first pair of upper support rails includes a connector member, and wherein each rearward strap of said two rearward straps is connected to said connector member, respectively.

16. The apparatus as recited in claim 15, wherein said frontward strap and said two rearward straps form a unitary Y-strap.

17. A method for using a walker apparatus, comprising the steps of:
providing a walker apparatus, comprising:
a frame having an upper frame, wherein said upper frame includes a first pair of upper support rails that are horizontally spaced apart by and connected to a first pair of front vertical braces and a second pair of back vertical braces;
a seat member connected to said upper frame, said seat member having a frontward strap that is removeably connected to said first pair of front vertical braces; and
a plurality of legs connected to said upper frame, wherein said plurality of legs provide vertical spacing of said upper frame above a supporting surface, and wherein said vertical spacing is adjustable;
wherein each front vertical brace of said first pair of front vertical braces includes a flange that extends out beyond the outer edge of said front vertical brace, wherein each front vertical brace of said first pair of front vertical braces includes a top recess, and wherein said flange is connected to a barrel that is dimensioned to be received by said top recess;
forming an ingress to said walker apparatus by forcing apart said first pair of front vertical braces;
entering by a user through said ingress into the interior of said frame of said walker apparatus;
closing said walker apparatus by forcing together said first pair of front vertical braces;
placing said seat member between the legs of said user;
connecting said frontward strap to said first pair of front vertical braces; and
sitting by said user on said seat member.

18. The method as recited in claim 16, further comprising the step of adjusting said vertical spacing between said upper frame and a supporting surface.

* * * * *